United States Patent
Alexander et al.

(10) Patent No.: US 6,839,731 B2
(45) Date of Patent: Jan. 4, 2005

(54) SYSTEM AND METHOD FOR PROVIDING DATA COMMUNICATION IN A DEVICE NETWORK

(75) Inventors: Bruce Alexander, Poulsbo, WA (US); David Antal, Silverdale, WA (US); Matthew Litke, Seattle, WA (US); Christoph Schebel, Suquamish, WA (US); Paul Thompson, Poulsbo, WA (US)

(73) Assignee: Vigilos, Inc., Seattle, WA (US)

( * ) Notice: Subject to any disclaimer, the term of this patent is extended or adjusted under 35 U.S.C. 154(b) by 0 days.

(21) Appl. No.: 10/443,120

(22) Filed: May 20, 2003

(65) Prior Publication Data

US 2004/0068657 A1 Apr. 8, 2004

Related U.S. Application Data

(60) Provisional application No. 60/382,035, filed on May 20, 2002.

(51) Int. Cl.[7] .................................................. G06F 15/16
(52) U.S. Cl. ........................ 709/201; 709/203; 709/219; 709/227; 713/176
(58) Field of Search ................................ 709/201, 203, 709/219, 227; 713/176

(56) References Cited

U.S. PATENT DOCUMENTS

| | | |
|---|---|---|
| 4,216,375 A | 8/1980 | Ulch et al. |
| 4,218,690 A | 8/1980 | Ulch et al. |
| 4,581,634 A | 4/1986 | Williams |
| 4,714,995 A | 12/1987 | Materna et al. |
| 4,721,954 A | 1/1988 | Mauch |
| 4,816,658 A | 3/1989 | Khandwala et al. |
| 4,837,568 A | 6/1989 | Snaper |
| 4,839,640 A | 6/1989 | Ozer et al. |
| 4,962,473 A | 10/1990 | Crain |
| 4,998,279 A | 3/1991 | Weiss |
| 5,097,505 A | 3/1992 | Weiss |

(List continued on next page.)

FOREIGN PATENT DOCUMENTS

| | | |
|---|---|---|
| EP | 0804031 A | 10/1997 |
| WO | WO 97/07486 A | 2/1997 |
| WO | WO 01/28251 | 4/2001 |

OTHER PUBLICATIONS

EyeCast.com Introduces SchoolCast services for School Safety Officials and Law Enforcement Agencies, Press Release dated Apr. 28, 1999.
EyeCast.com Adds 360–degree Continuous Pan Rotation Cameras to It's[sic] EyeView Service, Press Release dated Mar. 15, 1999.
Screen Printing from www.remotecams.com, "Take a Step Into the Future . . . ," printed Sep. 17, 1999.
EyeCast.com, "EyeCast secures deals . . . ," *Washington Business Journal*, Aug. 13–19, 1999, Tech Section, p. 16.
EyeCast.com Announces EyeView Control, Press Release dated Oct. 12, 1998.

(List continued on next page.)

*Primary Examiner*—Frantz B. Jean
(74) *Attorney, Agent, or Firm*—Christensen O'Connor Johnson Kindness PLLC

(57) ABSTRACT

A system and method for facilitating data communications in a device network are provided. An integrated information system includes a number of premises-server computing devices, a central communication device, and a number of client computing devices. Each client computing device communicates with the central communication device to request access to device data from the premises-server computing devices. Once access rights are established, the client computing devices communicate directly with specific premises-server computing devices. A command application resident on each premises-server computing device, referred to as the command proxy, administers the direct flow of data between the computing devices.

43 Claims, 9 Drawing Sheets

U.S. PATENT DOCUMENTS

| | | |
|---|---|---|
| 5,210,873 A | 5/1993 | Gay et al. |
| 5,367,624 A | 11/1994 | Cooper |
| 5,475,375 A | 12/1995 | Barrett et al. |
| 5,475,378 A | 12/1995 | Kaarsoo et al. |
| 5,544,062 A | 8/1996 | Johnston, Jr. |
| RE35,336 E | 9/1996 | Ulch et al. |
| 5,600,368 A | 2/1997 | Matthews, III |
| 5,614,890 A | 3/1997 | Fox |
| 5,629,981 A | 5/1997 | Nerlikar |
| 5,654,696 A | 8/1997 | Barrett et al. |
| 5,678,039 A | 10/1997 | Hinks et al. |
| 5,680,328 A | 10/1997 | Skorupski et al. |
| 5,682,142 A | 10/1997 | Loosmore et al. |
| 5,729,471 A | 3/1998 | Jain et al. |
| 5,742,286 A | 4/1998 | Kung et al. |
| 5,768,119 A | 6/1998 | Havekost et al. |
| 5,870,733 A | 2/1999 | Bass et al. |
| 5,903,455 A | 5/1999 | Sharpe, Jr. et al. |
| 5,923,264 A | 7/1999 | Lavelle et al. |
| 5,960,174 A | 9/1999 | Dew |
| 6,064,723 A * | 5/2000 | Cohn et al. ............... 379/88.14 |
| 6,233,588 B1 * | 5/2001 | Marchoili et al. .......... 707/200 |
| 6,356,949 B1 * | 3/2002 | Katsandres et al. ......... 709/238 |
| 2002/0019945 A1 * | 2/2002 | Houston et al. ............ 713/201 |
| 2002/0029263 A1 * | 3/2002 | Toyoshima et al. ......... 709/223 |

OTHER PUBLICATIONS

EyeCast Announces EyeCapture Services, Press Release dated Jul. 8, 1998.

EyeCast.com, Inc., "Providing Live Interactive Video for Surveillance & Monitoring Over the Internet".

Axis Communications, publication entitled "Axis 200+ Web Camera".

Axis Communications, publication entitled "Axis 240 Camera Server".

Axis Communications, www.axis.se/products/cam_240/, "30 Frames/Second," printed Sep. 28, 1999.

Axis Communications, ww.axis.se/products/camera_servers/cam_app_sol.htm, "Network Cameras Applications and Solutions," printed Sep. 28, 1999.

Axis Communications, www.axis.se/products/camera_servers/cam_fb.html, "Features and Benefits," printed Sep. 28, 1999.

* cited by examiner

SYSTEM AND METHOD FOR PROVIDING DATA COMMUNICATION IN A DEVICE NETWORK

CROSS-REFERENCE TO RELATED APPLICATION

This application claims the benefit of U.S. Provisional Application No. 60/382,035, entitled SYSTEM AND METHOD FOR PROVIDING DATA COMMUNICATION IN A DEVICE NETWORK, and filed on May 20, 2002. U.S. Provisional Application No. 60/382,035 is incorporated by reference herein.

FIELD OF THE INVENTION

In general, the present invention relates to computer software, computer hardware, communication networks, and in particular, to a method and system for real-time data communication, including device condition and state, between networked computing devices.

BACKGROUND OF THE INVENTION

A number and variety of hardware and software devices may be utilized to capture, process, or transmit data within a device network. In a commercial environment a device network could include bar code readers, point-of-sale terminals, card scanners, cash registers, receipt printers, video cameras, and the like. In a medical, or patient-monitoring environment, the devices might include various devices used for monitoring vital signs and body functions such as blood pressure monitors, respiratory activity monitors, heart activity monitors (such as electrocardiogram devices), brain activity monitors (such as electro-encephalography monitors), and various output device such as intravenous pumps, incubators, respirators, and the like. In a physical-security environment the devices utilized might include door and window contacts, card readers, video cameras, motion detectors, environmental sensors, metal detectors, scanning devices, electronic article surveillance tags, biometric devices, and the like. Accordingly, stated generally, the particular devices used in a device network will vary in accordance with the required function of the device network.

In a conventional security embodiment the controls for security, environmental, and access control devices are typically administered through hardware control panels. Control panels are used to physically activate, deactivate, or configure devices that are physically or logically connected to a panel. Control panels generally include some type of small format screen to display textual data reflective of a device's condition such as "armed" or "disarmed." A typical control panel has little memory and limited data processing or storage capacity. Further, the typical control panel is not well suited for data communication to remote monitoring terminals, such as the transmission of control commands from a remote monitoring terminal to a control panel. One approach to provide greater remote user functionality involves the use of a networked communications controller for facilitating communication to the devices. For example, devices such as video cameras can be connected to self-contained data collection/Web servers that operable to send collected data directly over a network without the assistance of an external device. Accordingly, information may be shared across a wide-area network ("WAN") with remote clients.

In one embodiment, a remote client may gain access to device data and control through the utilization of data access tools hosted by a network-based software application, generally referred to as a browser application. Generally described, browser applications require "handshake" or acknowledgment signals prior to an exchange of data. However, the handshaking steps consume available processing capacity and bandwidth that can constrain access to and flow of data. Additionally, data flow is typically initiated by the receiving computing device such that the receiving computing device must constantly poll another networked device for data to enable pseudo real-time communications. If the polling frequency is too large, time-sensitive data may become stale before it is received. If the polling frequency is too small, computing and communication resources are unnecessarily strained. Furthermore, as the data tools are designed for a generic network software application, some data tool features may not be supported various implementations of a network software application. Accordingly, the functionality for a class of users utilizing the particular hosting software application is diminished.

In another embodiment, a computing device may be loaded with a resident software application specifically constructed to communicate with the networked communications controller. Although the resident software application provides a user with a more permanent communications solution, conventional resident software applications can present security risks for unauthorized users accessing the computing device. In one aspect, the amount of data a user may be authorized to access may vary greatly. In another aspect, multiple users may be utilizing the same computing device, with each user having potentially varying authorization levels. Further, the utilization of resident software applications places the burden on each individual user to update the resident software application in the event modifications are made. Accordingly, resident software applications become deficient in addressing varying authorization rights and maintenance needs.

Thus, there is a need for a system and method for processing data communications in a networked environment.

SUMMARY OF THE INVENTION

A system and method for facilitating data communications in a device network are provided. The device network includes a number of physically distributed premises-based server computing devices in communication with a number of data generating input and/or output devices, a central communication device, and a number of client computing devices. Each client computing device communicates with the central communication device to request access to device data collected by the premises-based server computing devices. Once access rights are established, the client computing devices communicate directly with specific premises-server computing devices. A command application resident on each premises-based server computing device, referred to as the command proxy, administers the direct flow of data between the computing devices.

In accordance with an aspect of the present invention, a method for processing device data is provided. The method may be implemented in a system including one or more premises-based server computing devices in communication with a number of input and/or output devices, a central communication device, and at least one client computing device in communication with the central communication device. In accordance with the method, a client computing device transmits an access request to the central communication device. The access request includes one or more identification attributes corresponding to a client computing device. The client computing device obtains a listing of available premises-based server computing devices. The listing of available premises-based server computing devices corresponds to a set of premises-server computing devices a client computing device is authorized to access based at least in part on the identification attributes. The client computing device transmits a communication request to communicate with one or more premises-server computing devices and establishes a direct connection with a proxy application in each of the one or more premises-server computing devices for which the communication request is successful. The client computing device obtains device information from a proxy application associated with the premises-server computing device. The device information corresponds to a current device state. Additionally, the client computing device cannot establish a direct connection with a proxy application in each of the one or more premises-server computing devices prior to obtaining the listing of available premises-server computing devices.

In another aspect of the present invention, a method for processing device data is provided. The method may be implemented in a system including one or more premises-server computing devices in communication with a number of input and/or output devices, a central communication device and at least one client computing device in communication with the central communication device. In accordance with the method, a central communication device obtains an access request from a client computing device. The access request includes one or more identification attributes corresponding to the client device. The central communication device generates a list of premises-server computing devices available for communication with the client device. The list of premises-server computing devices corresponds to a set of premises-server computing devices the client device is authorized to access based upon a processing of the one or more identification attributes. The central communication device transmits the list of premises-server computing devices available for communication with the client device. The client device cannot directly access the premises-server computing device prior to obtaining the list of premises-server computing devices available for communication.

In accordance with a further aspect of the present invention, a method for processing device data is provided. The method may be implemented in a premises-server computing device in communication with a number of input and/or output devices, wherein the premises-server computing device includes a command proxy application for communicating with client computing devices. In accordance with the method, a premises-server computing device obtains a communication request from a client computing device and registers the client computing device to obtain device data from at least one input and/or output device. The premises-server computing device obtains device data from the at least one input and/or output device and transmits the device data to the client computing device. The transmission of the device data to the client computing device occurs without requiring a request from the client computing device.

In accordance with yet another aspect of the present invention, a system for processing device data is provided. The system includes at least one client computing device for transmitting access requests via a communication network. The access request includes one or more identification attributes corresponding to the client computing device. The system also includes a central communication device in communication with the client computing device via a communication network. The central communication devices receives the access request and transmits a list of available premises-server computing devices. The list of available premises-server computing devices corresponds to a set of premises the client computing device is authorized to access. The system further includes one or more premises-server computing devices in communication with a number of input and/or output devices. The one or more premises-server computing devices includes a proxy application to communicate with the client computing device via a direct communication connection and to transmit device data to the client computing device via the direct communication connection. The client computing device cannot establish the direct communication connection with the premises-server computing device prior to obtaining the list of available premises-server computing devices from the central communication device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
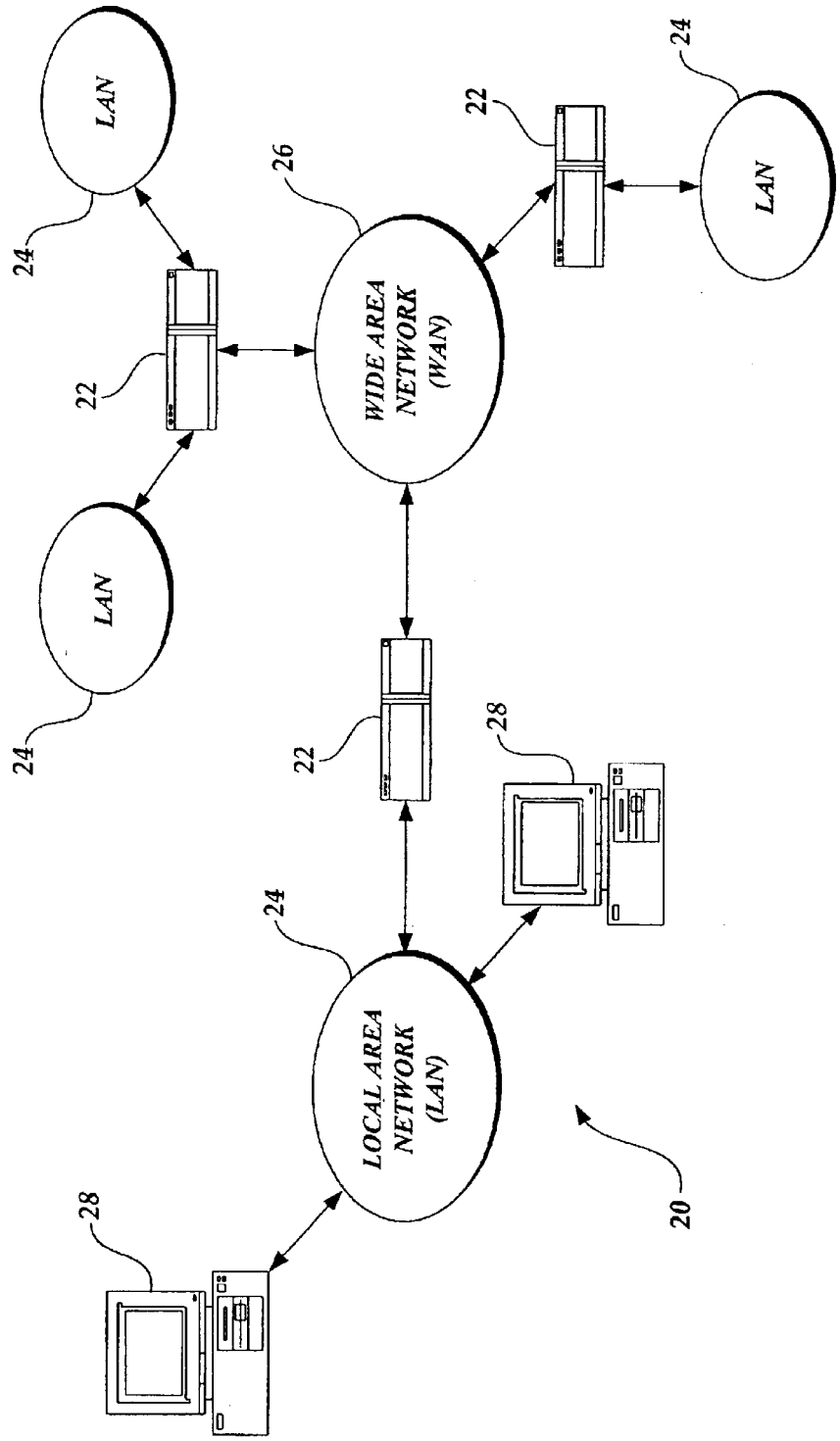
FIG. 1 is a block diagram of an Internet environment.

As described above, aspects of the present invention are embodied in a WWW or ("Web") site accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, in which a plurality of local area networks ("LANs") 24 and a wide area network ("WAN") 26 are interconnected by routers 22. The routers 22 are special purpose computers used to interface one LAN or WAN to another. Communication links within the LANs may be twisted wire pair, or coaxial cable, while communication links between networks may utilize 58 Kbps analog telephone lines, 1 Mbps digital T-1 lines, 45 Mbps T-3 lines or other communications links known to those skilled in the art. Furthermore, computers 28 and other related electronic devices can be remotely connected to either the LANs 24 or the WAN 26 via a modem and temporary telephone or wireless link. It will be appreciated that the Internet 20 comprises a vast number of such interconnected networks, computers, and routers and that only a small, representative section of the Internet 20 is shown in FIG. 1. One skilled in the relevant art will appreciate that aspects of the present invention may be practiced on Internet networks, such as an Intranet.

The Internet has grown exponentially over the past decade and now links millions of computers worldwide. As the Internet has grown, so has the WWW. As is appreciated by those skilled in the art, the WWW is a vast collection of interconnected or "hypertext" documents written in Hyper-Text Markup Language ("HTML"), or other markup languages, that are electronically stored at WWW sites throughout the Internet. A WWW site is a server connected to the Internet that has mass storage facilities for storing hypertext documents and that runs administrative software for handling requests for those stored hypertext documents. A hypertext document normally includes a number of hyperlinks, i.e., highlighted portions of text which link the document to another hypertext document possibly stored at a WWW site elsewhere on the Internet. Each hyperlink is associated with a Uniform Resource Locator ("URL") that provides the exact location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA® programming language from Sun Microsystems, for execution on a remote computer. Likewise, a WWW server may also include facilities for executing scripts and other application programs on the WWW server itself.

A consumer or other remote consumer may retrieve hypertext documents from the WWW via a WWW browser application program. A WWW browser, such as Netscape's NAVIGATOR® or Microsoft's Internet Explorer, is a software application program for providing a graphical consumer interface to the WWW. Upon request from the consumer via the WWW browser, the WWW browser accesses and retrieves the desired hypertext document from the appropriate WWW server using the URL for the document and a protocol known as HyperText Transfer Protocol ("HTTP"). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA applets, for execution on the client computer.

Figure 2:
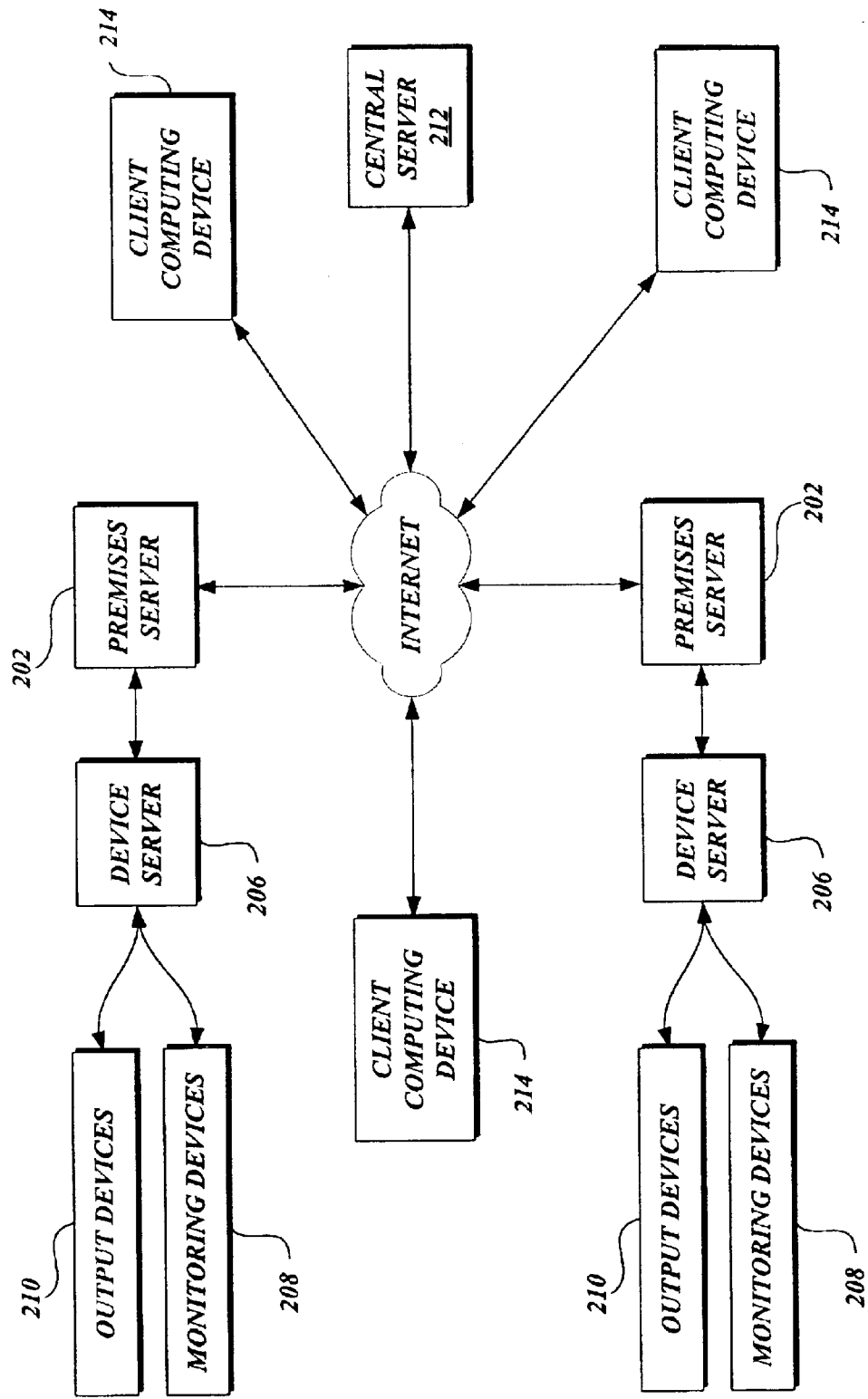
FIG. 2 is a block diagram illustrative of an integrated information system including a number of premises servers, a central server and a number of client computing devices formed in accordance with the present invention.

Referring now to FIG. 2, an actual embodiment of an integrated information system 200 in accordance with the present invention will be described. The integrated information system 200 is a subscriber-based system allowing monitoring devices (or a subset thereof) within one or more premises to be processed from a single, remote control location by way of a client computing device connected to a communication network. Additionally, the data from the monitoring devices may be processed at the remote control location according to one or more data rules. The control location may also customize output of the processed data dependent on an evaluation of the data rule pertaining to the device data. While the system of the present invention is utilized to integrate traditional security monitoring functions, it is also utilized to integrate any information input in a like manner.

With reference to FIG. 2, the integrated information system 200 includes a premises server 202 that functions as a communication gateway between various monitoring devices 208 and output devices 210 and the integrated information system 200. The premises server 202 includes a resident application program, referred to as a command proxy 204, that is operable to facilitate communication with external components of the integrated information system 200. The function of the command proxy application 204 will be explained in greater detail below.

In an illustrative embodiment of the present invention, the premises server 202 communicates with one or more device servers 206 via a communication network, such as a subnet, to address individual monitoring devices 208 and/or output devices 210. For example, the subnet may be a switched Ethernet network that runs through a high-speed switch. One or more device servers 206 may be configured in a distributed network to facilitate the sharing of computing resources, including processing, memory, and communication bandwidth. An illustrative device server network can be found in commonly assigned U.S. application Ser. No. 10/117,557 entitled SYSTEM AND METHOD FOR MANAGING A DEVICE NETWORK, which is hereby incorporated by reference. Alternatively, the premises server 202 may communicate directly with the monitoring devices 208 and output devices 210.

In accordance with the present invention, the monitoring devices 208 can include any number of sensors, monitors, and control devices (both hardware and software) used for environmental monitoring, access control, biometric identification, facial recognition, and intrusion detection. Still further, the monitoring devices 208 can include devices used to monitor industrial processes, inventory control processes, financial transactions (including point-of-sale systems) and medical or patient monitoring. It will be apparent to one skilled in the relevant art that additional or alternative monitoring devices 208 may be practiced with the present invention.

The device servers 206 also communicate with one or more output devices 210. In an illustrative embodiment, the output devices 210 can include audio speakers, display or other audio/visual displays. The output devices 210 may also include electrical or electro-mechanical devices that allow the system to perform actions. The output devices 210 can include computer system interfaces, point-of-sale terminals, cash registers, automatic teller machines, telephone interfaces, wireless interfaces, door and window locking mechanisms, aerosol sprayers, and the like. As will be readily understood by one skilled in the art, the type of output device is associated primarily with the type of action the integrated information system 200 produces. Accordingly, additional or alternative output devices 210 are considered to be within the scope of the present invention.

With continued reference to FIG. 2, the premises server 202 is in communication with a central server 212. Generally described, the central server 212 manages the number of premises servers 202 connected to the integrated information system 200. Additionally, the central server 212 manages access rights for external components attempting to access device data from the various premises servers 202. In an illustrative embodiment of the present invention, the central server 212 may also be operable to obtain monitoring device data from the premises servers 202 and process the data according to a number of processing rules. A description for a system and method for processing monitoring device data may be found in commonly assigned U.S. application Ser. No. 09/825,506 entitled SYSTEM AND METHOD FOR IMPLEMENTING AN INTEGRATED INFORMATION PORTAL, the disclosure of which is hereby incorporated by reference.

With continued reference to FIG. 2, the integrated information system 200 also includes one or more client computing devices 214 operable to communicate with the premises servers 202 and the central server 212. Each client computing device 214 corresponds to one or more authorized users having distinct access rights to the monitoring device data provided by the premises servers 202. For example, the client computing device 214 can be associated with premises owners, security directors or administrators, on-site security guards, technicians, remote monitors (including certified and non-certified monitors), customer service representatives, emergency personnel, and others.

The client computing devices 214 can include personal computers, hand-held computing devices, wireless application protocol enabled wireless devices, cellular or digital telephones, digital pagers, and the like. Moreover, the central server 212 may communicate with these devices via the Internet 20 utilizing electronic messaging or Web access, via wireless transmissions utilizing the wireless application protocol, short message services, audio transmission, and the like. As will be readily understood by one skilled in the art, the specific implementation of the communication mediums may require additional or alternative components to be practiced. All are considered to be within the scope of practicing the present invention. Additionally, in an illustrative embodiment of the present invention, each client computing device 214 utilizes a software application provided by the central processing server 212 to communicate with the premises servers 202, which will be explained in greater detail below. Although the premises server 202 and the central processing server 212 are referred to as "server" computing device, one skilled in the relevant art will appreciate that a variety of computing devices may provide the functionality associated with either premises server 202 or the central processing server 212. For example, the functionality may implemented in a peer-to-peer network environment.

Figure 3:
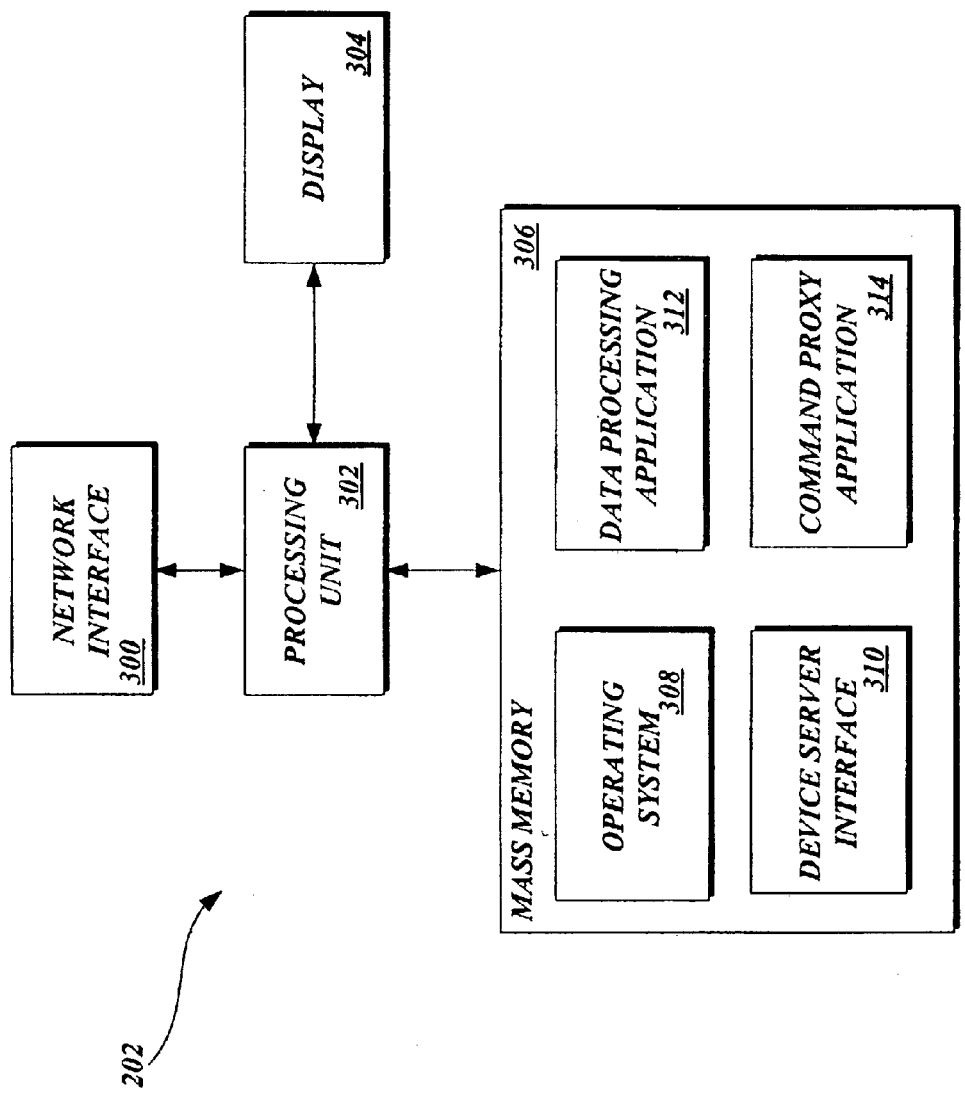
FIG. 3 is a block diagram depicting an illustrative architecture for a premises server in accordance with the present invention.

FIG. 3 is a block diagram depicting an illustrative architecture for a premises server 202. Those of ordinary skill in the art will appreciate that the premises server 202 include many more components than those shown in FIG. 3. However, it is not necessary that all of these generally conventional components be shown in order to disclose an illustrative embodiment for practicing the present invention. As shown in FIG. 3, the premises server 202 includes a network interface 300 for connecting directly to a LAN or a WAN, or for connecting remotely to a LAN or WAN. Those of ordinary skill in the art will appreciate that the network interface 300 includes the necessary circuitry for such a connection, and is also constructed for use with the TCP/IP protocol, the particular network configuration of the LAN or WAN it is connecting to, and a particular type of coupling medium. The premises server 202 may also be equipped with a modem for connecting to the Internet through a point-to-point protocol ("PPP") connection or a serial line Internet protocol ("SLIP") connection as known to those skilled in the art.

The premises server 202 each includes a processing unit 302, an optional display 304, and a mass memory 306, all connected via a communication bus, or other communication device. The mass memory 306 generally comprises a RAM, ROM, and a permanent mass storage device, such as a hard disk drive, tape drive, optical drive, floppy disk drive, or combination thereof. The mass memory 306 stores an operating system 308 for controlling the operation of the premises server 202. It will appreciated that this component may comprises a general-purpose server operating system as is known to those skilled in the art, such as UNIX, LINUX™, or Microsoft WINDOWS NT®.

The mass memory 306 also stores program code and data for interfacing with various connected monitoring devices 208 and output devices 210, for processing the monitoring device data and for transmitting the data to client computing devices 214 and/or a central server 212. More specifically, mass memory stores a device interface application 310 in accordance with the present invention to obtain monitoring device data. The device interface application 310 comprises computer-executable instructions which, when executed by the premises server 202 obtains and transmits device data as will be explained below in greater detail. The mass memory 306 also stores a data processing application 312 for processing incoming and outgoing data. One skilled in the relevant art will appreciate that processing data can include encryption, compression, transformation, and the like. The mass memory 306 also stores a data messaging and delivery application known as a command proxy application 314 application. The command proxy application 314 is operable to manage data communications between the client computers 314/central server 212 and the premises server 212. It will be appreciated that these components may be stored on a computer-readable medium and loaded into the memory of the premises server using a drive mechanism associated with the computer-readable medium, such as a floppy, CD-ROM, DVD-ROM drive, or network drive 300.

Figure 4:
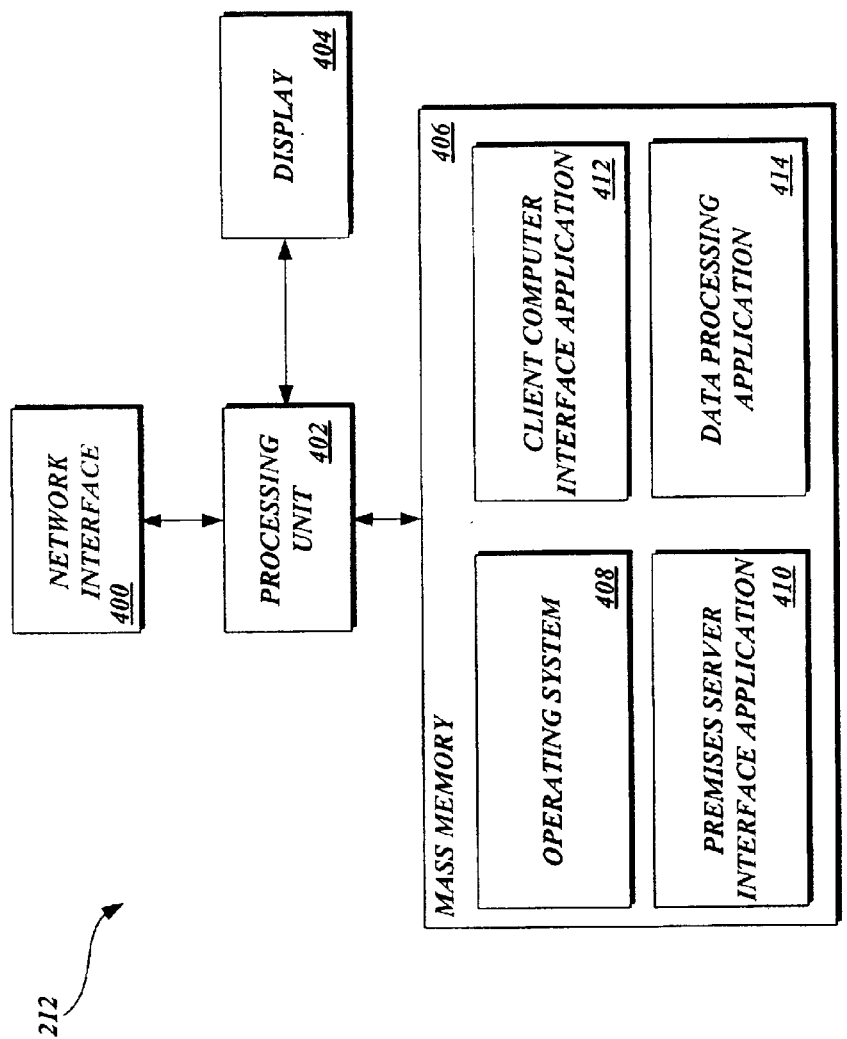
FIG. 4 is a block diagram depicting an illustrative architecture for a central server in accordance with the present invention.

FIG. 4 is a block diagram depicting an illustrative architecture for a central server 212 in accordance with the present invention. Those of ordinary skill in the art will appreciate that the central server 212 includes many more components then those shown in FIG. 4. However, it is not necessary that all of these generally conventional components be shown in order to disclose an illustrative embodiment for practicing the present invention. As shown in FIG. 4, the central server 212 includes a network interface 400 for connecting directly to a LAN or a WAN, or for connecting remotely to a LAN or WAN. Those of ordinary skill in the art will appreciate that the network interface 400 includes the necessary circuitry for such a connection, and is also constructed for use with the TCP/IP protocol, the particular network configuration of the LAN or WAN it is connecting to, and a particular type of coupling medium. The central server 212 may also be equipped with a modem for connecting to the Internet 20.

The central server 212 also includes a processing unit 402, an optional display 404 and a mass memory 406, all connected via a communication bus, or other communication device. The mass memory 406 generally comprises a RAM, ROM, and a permanent mass storage device, such as a hard disk drive, tape drive, optical drive, floppy disk drive, or combination thereof. The mass memory 406 stores an operating system 408 for controlling the operation of the central server 212. It will appreciated that this component may comprises a general-purpose server operating system as is known to those skilled in the art, such as UNIX, LINUX™, or Microsoft WINDOWS NT®.

The mass memory 406 also stores program code and data for interfacing with the premises servers 202 and the client computing devices 214 and for processing various data requests. More specifically, the mass memory 406 stores a premises server interface application 410 in accordance with the present invention for communicating with the premises server 202. The premises interface application 410 comprises computer-executable instructions, which, when executed by the central server 212, interfaces with the premises server 202 as will be explained below in greater detail. The mass memory 406 also stores a client computer interface application 412 for communicating with client computing devices 214 to obtain data requests and transmit communication software. The operation of the client computer interface application 412 will be described in greater detail below. The mass memory 406 also stores a data processing application 414 for processing client computing device 214 data requests in accordance with the present invention. It will be appreciated that these components may be stored on a computer-readable medium and loaded into the memory of the central server using a drive mechanism associated with the computer-readable medium, such as a floppy, CD-ROM, DVD-ROM drive, or network drive 400.

Figure 5:
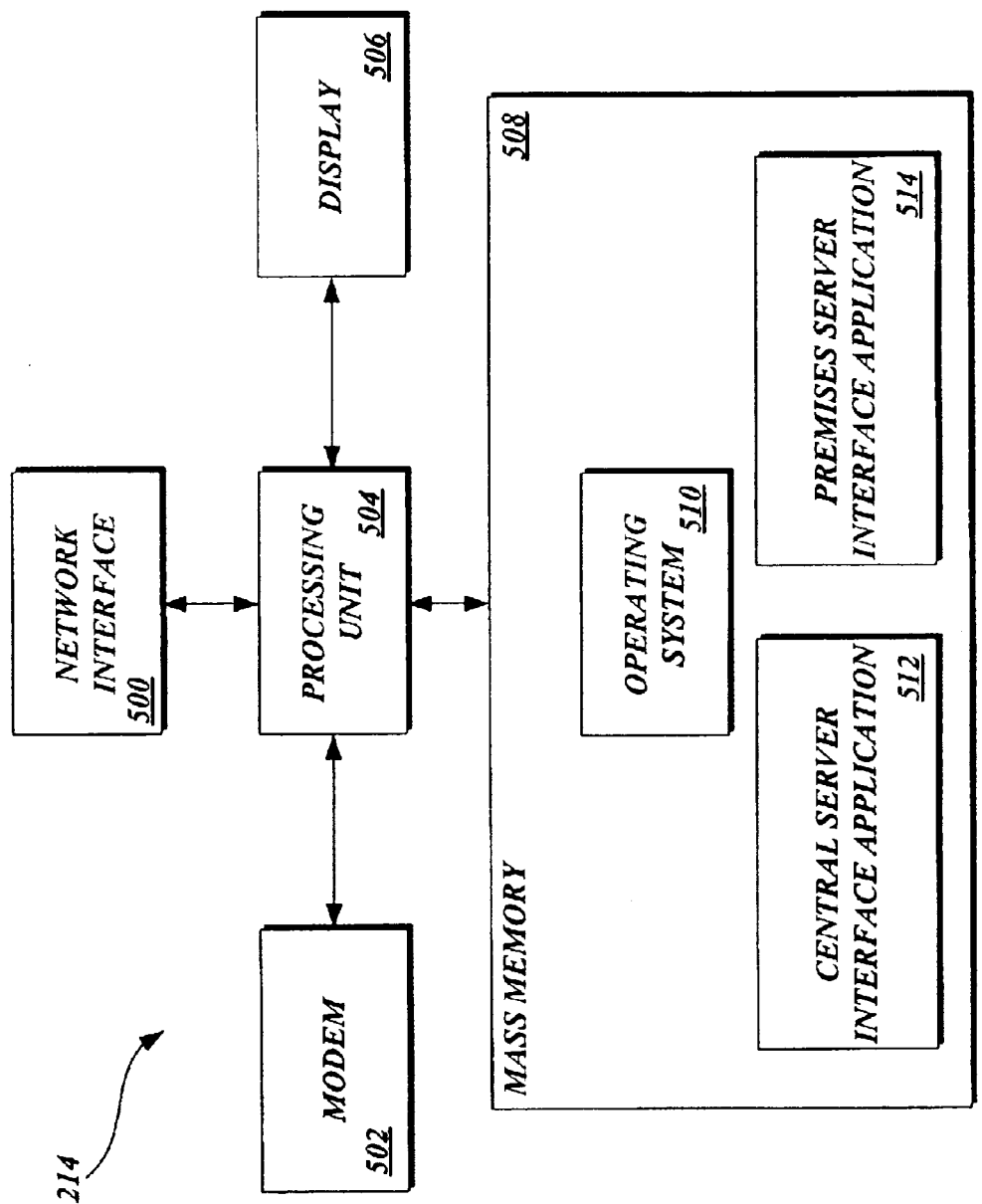
FIG. 5 is a block diagram depicting an illustrative architecture for client computing device in accordance with the present invention.

FIG. 5 is a block diagram depicting an illustrative architecture for a client computing device 214 utilized by authorized users to request and gain access to premises servers 202 in accordance with the present invention. Those of ordinary skill in the art will appreciate that the client computing device 214 includes many more components then those shown in FIG. 5. However, it is not necessary that all of these generally conventional components be shown in order to disclose an illustrative embodiment for practicing the present invention. As shown in FIG. 5, the client computing device 214 includes a network interface 500 for connecting directly to a LAN or a WAN, or for connecting remotely to a LAN or WAN. Those of ordinary skill in the art will appreciate that the network interface 500 includes the necessary circuitry for such a connection, and is also constructed for use with the TCP/IP protocol, the particular network configuration of the LAN or WAN it is connecting to, and a particular type of coupling medium. The client computing device 214 may also be equipped with a modem 502 for connecting to the Internet 20 through a PPP or SLIP connection as known to those skilled in the art.

The client computing device 214 also includes a processing unit 504, a display 506, and a mass memory 508, all connected via a communication bus, or other communication device. The mass memory 508 generally comprises a RAM, ROM, and a permanent mass storage device, such as a hard disk drive, tape drive, optical drive, floppy disk drive, or combination thereof. The mass memory 508 stores an operating system 510 for controlling the operation of the computing device. It will appreciated that this component may comprise a general-purpose operating system as is known to those skilled in the art, such as UNIX, LINUX™, or Microsoft WINDOWS NT®. The mass memory 508 also includes a central server interface application 512 operable to communicate with the central server 212. In an illustrative embodiment of the present invention, the central server interface application 512 includes a WWW browser application. The mass memory 508 further stores a premises server interface application 514 operable to interface with one or more premises servers 202. It will be appreciated that these components may be stored on a computer-readable medium and loaded into the memory of the central server using a drive mechanism associated with the computer-readable medium, such as a floppy, CD-ROM, DVD-ROM drive, or network drive 500.

Generally described, the present invention provides a distributed network environment for processing monitoring device 208 and output device 210 data. In an actual embodiment of the present invention, the central server 212 manages client computer request connection requests and provides requesting client computers access to one or more of the premises servers 212. Upon establishing access rights to a premises server 202, the client computer device 214 establishes a direct communication connection to targeted premises servers via the command proxy application 314. Through the direct communication connection, the command proxy application 314 and the client computing device 214 can transmit data as it is modified.

Figure 6:
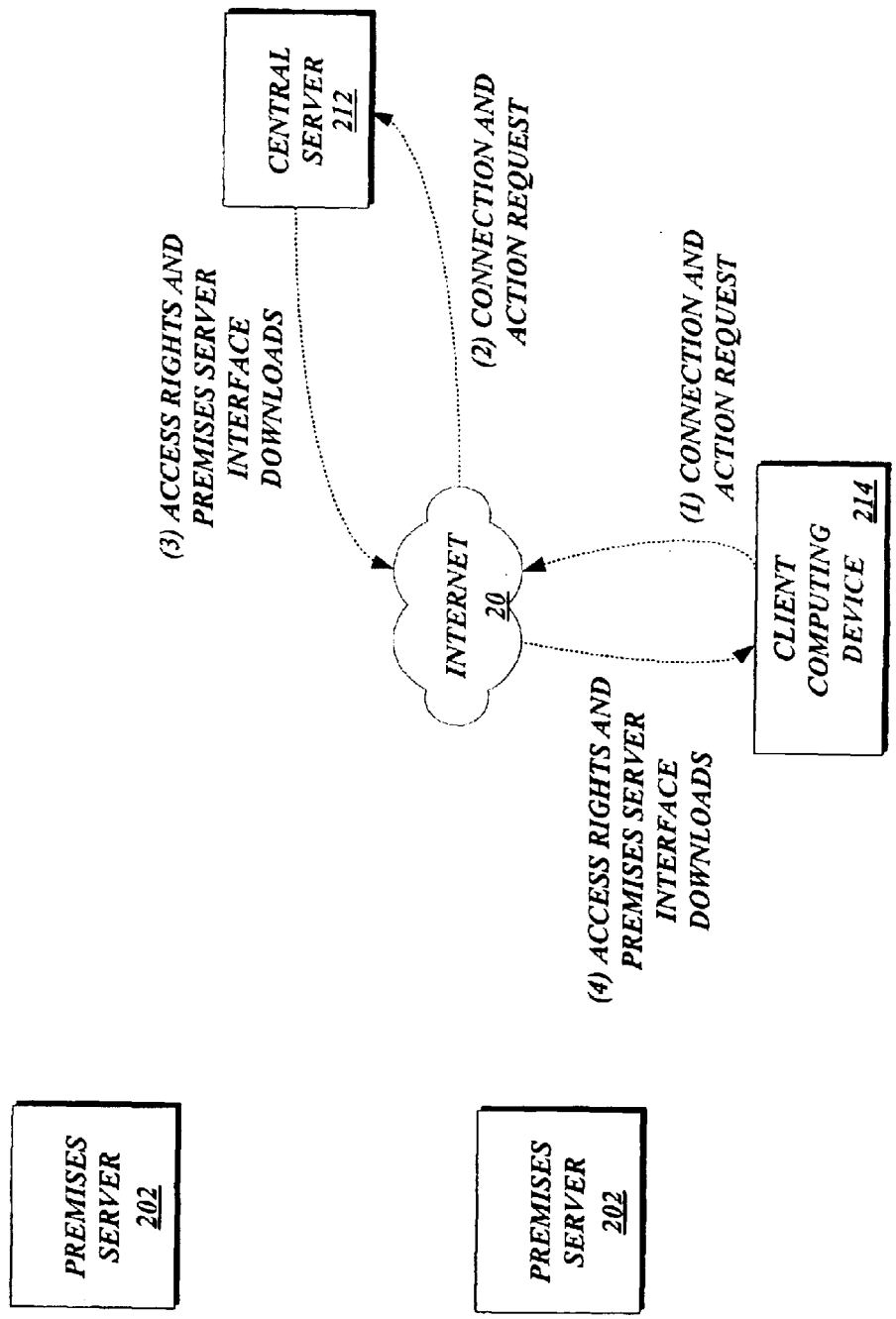
FIG. 6 is a block diagram of the integrated information system of FIG. 2 illustrating the connection of a client computing device to a premises server in accordance with the present invention.
Figure 7:
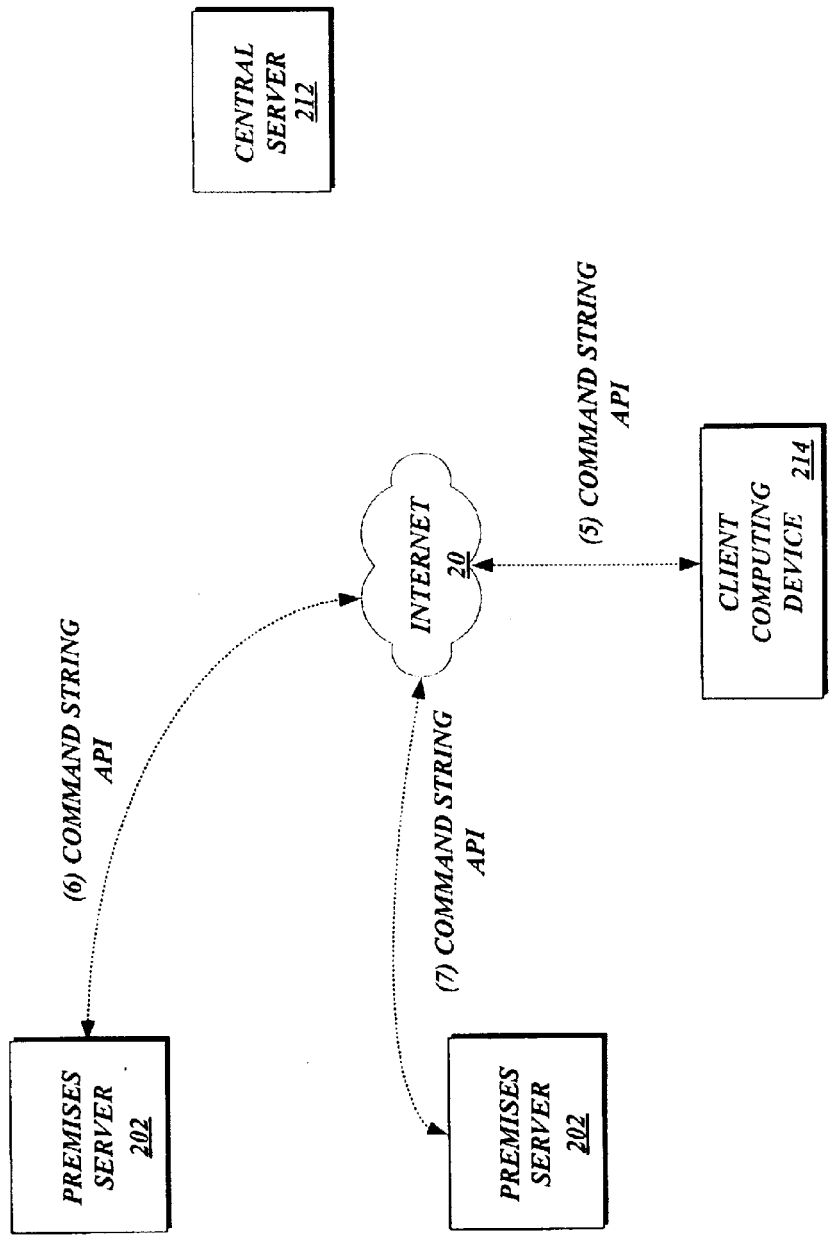
FIG. 7 is a block diagram of the integrated information system of FIG. 2 illustrating the connection of a client computing device to a premises server in accordance with the present invention.
Figure 8:
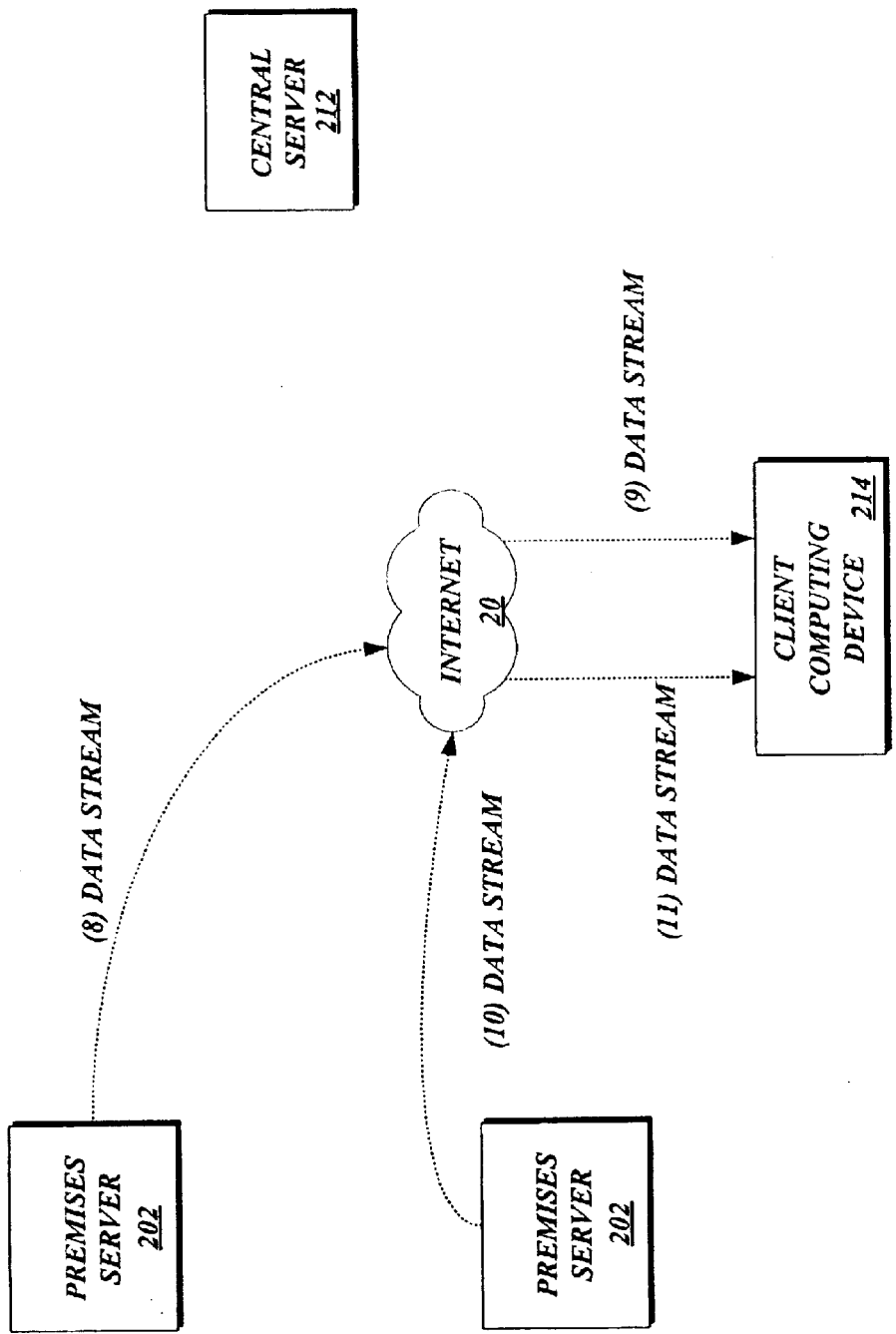
FIG. 8 is a block diagram of the integrated information system of FIG. 2 illustrating the connection of a client computing device to a premises server in accordance with the present invention.

FIGS. 6-8 are illustrative of various integrated information system component interactions to process client computing device connection requests in accordance with the present invention. With reference to FIG. 6, a client computing device 214 initiates a communication request by transmitting an access request to the central server 212. In an illustrative embodiment of the present invention, the connection request is transmitted by the central server interface application 512 (FIG. 5), utilizing a WWW browser application. The access request can include information indicative of the access rights of a user associated with the client computing device 214 and of the version and resources of the premises server interface application 514 stored on the client computing device.

Upon receipt of the access request, the central server 212 processes the request to identify which premises servers 202 the client computing device 214 may access. Additionally, the central server 212 may also determine whether the client computing device 214 requires an additional software upgrade or update for the premises server interface application 514. The central server 212 transmits to the client computing device 214 a listing identifying which premises servers 202 are available for a data connection. Additionally, the central server 212 may transmit the premises server interface application 514 or updates to the current version of the premises server interface application 514 running on the client computing device 214. In an illustrative embodiment of the present invention, the central server 212 may utilize a Web-based software system, such as Sun Microsystems's JAVA WEB START, that enables the central server 212 to distribute and update the premises server interface application 514 via a WWW connection.

With reference now to FIG. 7, the client computer 214 obtains the access list and any software downloads/updates transmitted by the central server 212. Depending on a user selection, the client computing device 214 then initiates a command proxy interface protocol with the selected command proxy applications 314 (FIG. 3) on each selected premises server 202. The designated premises server 202 responds to the command proxy interface protocol and registers the client computing device with the command proxy application 314 of the premise server. In an illustrative embodiment of the present invention, the command proxy interface protocol allows the client computing device 214 to register with the command proxy application to receive monitoring device data. Further, the command proxy interface protocol allows the client computing device 214 to select which monitoring device data is requested and how the monitoring device data should be delivered. In certain embodiments, the client computing device 214 maintains a persistent connection to the command proxy application, in others the connection may be timed, periodic, or transitory.

With reference now to FIG. 8, upon registration by the client computing device 214, the command proxy application 314 can detect various monitoring device data changes. In an illustrative embodiment of the present invention, the data changes can include the transmission of monitoring device data from the monitoring devices 208. Additionally, the data changes can also include data or configuration changes submitted by a system administrator or other authorized user of the integrated information system 200. The command proxy application 314 can then transmit the data changes to the client computing device 214 in accordance with the registration requirements of the client computing device. Accordingly, the command proxy application 314 may individually filter outgoing data for each client computing device 214 registered with the command proxy application. Further, in an actual embodiment of the present invention, the command proxy application may also be operable to associate various data changes with a selected device to determine whether to send the related data should also be transmitted to the client computing device. Thus, the client computing device 214 can effectuate the receipt of selective real-time data from a number of premises servers 202.

Figure 9:
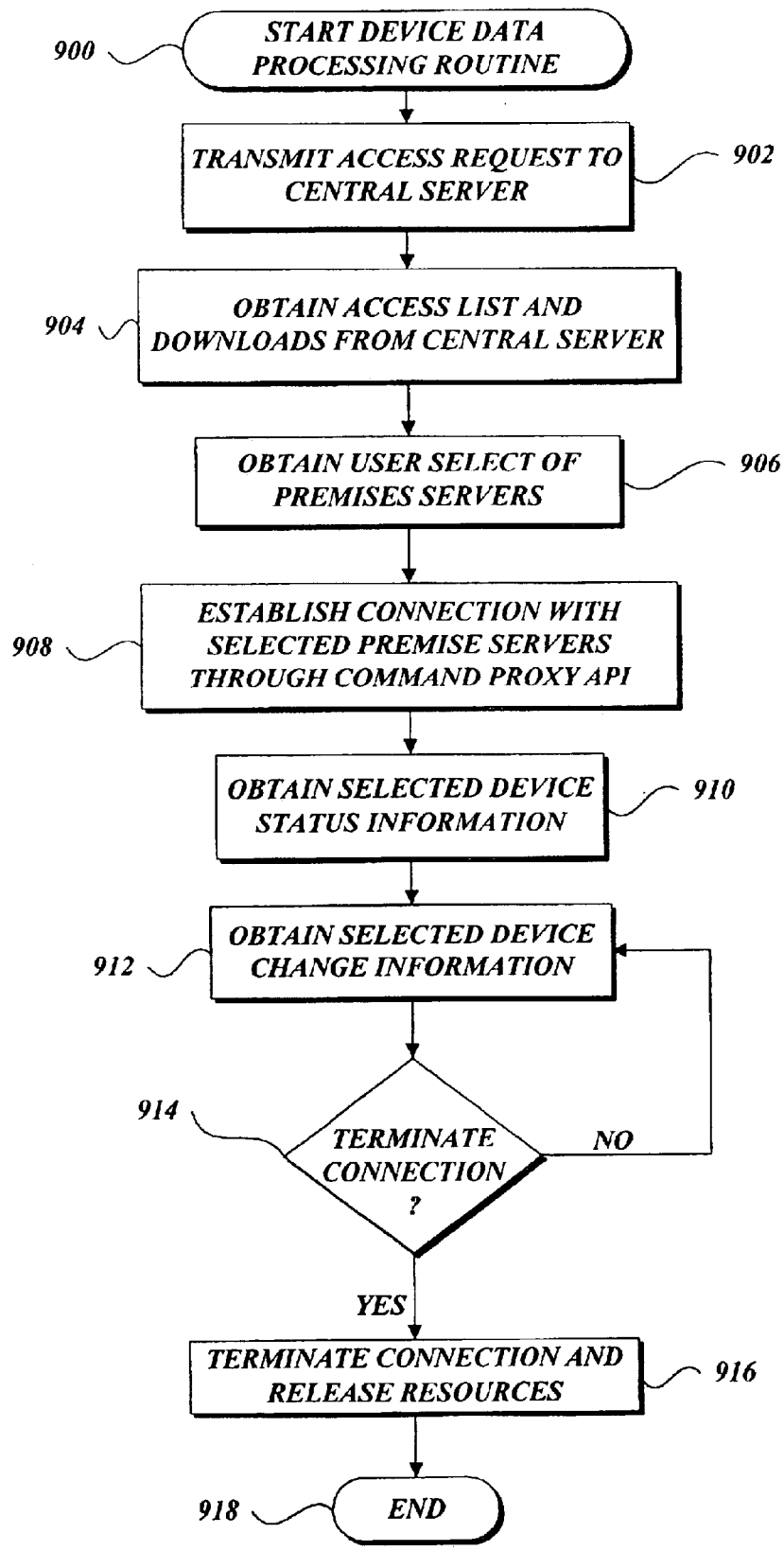
FIG. 9 is a flow diagram illustrative of device data monitoring routine implemented by a client computing device in accordance with the present invention.

FIG. 9 is a flow diagram illustrative of a device data monitoring routine 900 implemented by the client computing device 214 in accordance with the present invention. At block 902, the central server interface application 512 of the client computing device 214 initiates an access request with the central server 212. In an illustrative embodiment of the present invention, the central server interface application 512 may be a WWW browser-based application operable to communicate with the central server 212 via the WWW. At block 904, the central server interface application 512 obtains an access list and any applicable downloads from the central server. As discussed above, in an illustrative embodiment of the present invention, the distribution of the access list and the applicable downloads may be accomplished via a distribution such as JAVA WEB START. However, one skilled in the relevant art will appreciate that alternative distribution systems may be also be utilized in accordance with the present invention.

At block 906, the client computing device 214 obtains a selection of one or more premises servers 202 to monitor. At block 908, the premises server interface application 514 connects to each designated premises server 202 and registers with the command proxy application 314 residing on the premises server 202. In an illustrative embodiment of the present invention, the premises server interface application 514 may utilize a command proxy interface protocol to establish a connection with the command proxy application 314 and register data receipt preferences with the command proxy application 314. The command proxy interface protocol allows the client computing device 214 to register for specific data change events (e.g., specify types of data, data from specific devices) that are of interest and specify value ranges that will require that the client computing device be notified. One skilled in the relevant art will appreciate that types of available data will depend on the available devices connected to a selected premises server 202 and/or the potential utilization of the devices (e.g., security monitoring, patient care, inventory monitoring, and the like). Further, the command proxy interface protocol allows a client computing device to prioritize data change types for immediate or delayed transmission. One skilled in the relevant art will appreciate, however, alternative or modified command proxy interface protocols may also be practiced with the present invention.

In an actual embodiment of the present invention, the client computing device 214 may utilize an IP address specified in the communication with the central server 202 to identify the appropriate premise server 202. Accordingly, the first message sent by the client computing device 214 should include a command string identifying a particular premises server 202.

At block 910, the premises server interface application 514 obtains current device information from the premises server 202. In an actual embodiment of the present invention, the premises server 202 initializes the data transmission by transmitting selected device status information to the client computing device 214. At block 912, the premises server interface application 512 obtains changed data from the command proxy application 314. In an illustrative embodiment of the present invention, the command proxy application 314 for each premises server 202 can maintain a table corresponding to all data objects, such as a monitoring device 208 in its control, and the potential attribute values for the data objects. Further, the command proxy application 314 identifies the client computing devices 214 that have registered for notification for each data object attribute value. Accordingly, as data changes are received, the data processing application 312 can identify which client computing devices 214 are to be contacted by evaluating the relevant data managed by the command proxy application table.

At decision block 914, a test is conducted to determine whether the user has indicated a desire to terminate the connection. If the user does not wish to terminate the connection, the routine 900 returns to block 910. Alternatively, if the user wishes to terminate the connection, the client computing device 214 releases the connection at block 916. At block 918, the routine 900 terminates.

In an actual embodiment of the present invention, the monitoring device data can be categorized and processed as asset data, resource data, or device data. Asset data is obtained from a monitoring device corresponding to an identifiable object that is not capable of independent action. For example, asset data includes data obtained from a bar code or transponder identifying a particular object, such as a computer, in a particular location. Resource data is obtained from a monitoring device corresponding to an identifiable object that is capable of independent action. For example, resource data includes data from a magnetic card reader that identifies a particular person who has entered the premises. Event data is obtained from a monitoring device corresponding to an on/off state that is not correlated to an identifiable object. Event data is a default category for all of the monitoring devices. An illustrative system and method for processing asset data, resource data, and device data can be found in commonly assigned U.S. application Ser. No. 09/825,506, which has been incorporated by referenced. As will be readily understood by one skilled in the relevant art, alternative data categorizations are considered to be within the scope of the present invention.

The present invention provides a method for obtaining real-time device data over a network connection from a hardware and software monitoring devices. The invention describes an architecture that can be flexibly used to operate within or outside of a browser application. The system provides the ability to use application features regardless of whether they are supported by the browser applications or operating system in use on a client computing device.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. In a system including one or more premises-server computing devices in communication with a number of input and/or output devices, a central communication device, and at least one client computing device in communication with the central communication device, a method for processing device data, the method comprising:

transmitting an access request to the central communication device, the access request including one or more identification attributes corresponding to a client computing device;

obtaining a listing of available premises-server computing devices, the listing of available premises-server computing devices corresponding to a set of premises-server computing devices a client computing device is authorized to access based at least in part on the identification attributes;

transmitting a communication request to communicate with one or more premises-server computing devices;

establishing a direct connection with a proxy application in each of the one or more premises-server computing devices for which the communication request is successful; and obtaining device information from each proxy application associated with the one or more premises-server computing device, the device information corresponding to a current input and/or output device state;

wherein establishing a direct connection with a proxy application in each of the one or more premises-server computing devices cannot occur prior to obtaining the listing of available premises-server computing devices.

2. The method as recited in claim 1, wherein transmitting an access request includes transmitting information used to authenticate an individual user.

3. The method as recited in claim 1, wherein transmitting an access request includes:

accessing a network-based Web site corresponding to the central communication device;

providing the one or more identification attributes; and submitting the access request via the network-based Web site.

4. The method as recited in claim 1, wherein obtaining a listing of available premises-server computing devices includes obtaining a listing of available input and/or output devices connected to each of the available premises-server computing devices.

5. The method as recited in claim 4, wherein transmitting a communication request to communicate with one or more premises-server computing devices includes transmitting a selection to receive data from one or more available devices.

6. The method as recited in claim 5, wherein transmitting a communication request includes transmitting information used for the delivery of input and/or output device data.

7. The method as recited in claim 1, wherein transmitting a communication request to communicate with one or more premises-server computing devices includes initiating a command proxy protocol registering a client computing device with the proxy application of the premises-server computing device.

8. The method as recited in claim 1, wherein the direct connection with the proxy application is a persistent connection.

9. The method as recited in claim 1 further comprising obtaining updated input and/or output device data from the proxy application, wherein the updated device data is obtained without subsequent request from the client computing device.

10. The method as recited in claim 1 further comprising obtaining software updates from the central communication device upon transmitting an access request to the central communication device.

11. The method as recited in claim 1, wherein establishing a direct connection with a proxy application includes establishing a direct connection with a proxy application in a private network.

12. The method as recited in claim 1, wherein obtaining device information from each proxy application in the one or more premises-server computing device includes obtaining device information filtered in accordance with one or more criteria submitted to the proxy application.

13. A computer-readable medium having computer-executable instructions for performing the method recited in claim 1.

14. A computer system including a processor, a memory and an operating system, the computer system operable to perform the method recited in claim 1.

15. In a system including one or more premises-server computing devices in communication with a number of input and/or output devices, a central communication device and at least one client computing device in communication with the central communication device, a method for processing device data, the method comprising:

obtaining an access request from a client computing device, the access request including one or more identification attributes corresponding to the client device;

generating a list of premises-server computing devices available for communication with the client device, the list of premises-server computing devices corresponding to a set of premises-server computing devices the client device obtains access based upon a processing of the one or more identification attributes; and transmitting the list of premises-server computing devices available for communication with the client device;

wherein the client device cannot directly access the premises-server computing device prior to obtaining the list of premises-server computing devices available for communication.

16. The method as recited in claim 15, wherein obtaining an access request includes obtaining a user identification and password.

17. The method as recited in claim 15 further comprising:

generating a network-based Web site in response to an initial access request from a client device; and obtaining a user input of the one or more identification attributes corresponding to the client device.

18. The method as recited in claim 15, wherein transmitting the list of premises-server computing devices available for communication with the client device includes transmitting an identification of one or more devices associated with each of the premises-server computing device available for communication.

19. The method as recited in claim 15, wherein transmitting the list of premises-server computing devices available for communication with the client device includes transmitting an IP address corresponding to each premises-server computing device, the IP address facilitating direct communication with a premises-server computing device.

20. The method as recited in claim 15 further comprising transmitting software updates with the transmission of the list of available premises-server computing devices.

21. A computer-readable medium having computer-executable instructions for performing the method recited in claim 15.

22. A computer system having a processor, a memory and an operating system, the computer system operable to perform the method recited in claim 15.

23. In a premises-server computing device in communication with a number of input and/or output devices, wherein the premises-server computing device includes a command proxy application for communicating with client computing devices, a method for processing device data comprising:
   obtaining a communication request from a client computing device;
   registering the client computing device to obtain device data from at least one input and/or output device;
   obtaining device data from the at least one input and/or output device;
   transmitting the device data to the client computing device, wherein transmitting the device data to the client computing device occurs without requiring a request from the client computing device.

24. The method as recited in claim 23, wherein registering the client computing device includes registering interest in updates made to one or more records in a table used to collect attribute data associated with the input and/or devices.

25. The method as recited in claim 24, wherein the table of available input and/or output device data includes criteria for filtering the data to be received by the client computing device.

26. The method as recited in claim 25, wherein filtering the data from the input and/or output device includes a threshold of data values to be satisfied prior to transmitting the input and/or output device data to the client computing device.

27. The method as recited in claim 25, wherein filtering the input and/or output device data includes a range of data values that must be satisfied prior to transmitting the data from the input and/or output device to the client computing device.

28. A computer-readable medium having computer-executable instructions for performing the method recited in claim 25.

29. A computer system having a processor, a memory and an operating environment, the computer system operable to perform the method recited in claim 25.

30. The method as recited in claim 24, wherein the table of available device data includes instructions for processing the data from the input and/or device to be received by the client computing device.

31. The method as recited in claim 30, wherein processing the input/and or output device data includes prioritizing the data from the input and/or output device.

32. The method as recited in claim 30, wherein processing the data from the input/and or output device includes formatting.

33. The method as recited in claim 24, wherein the table of available input and/or output device data includes a schedule for transmitting data from the input and/or output device to the client computing device.

34. A system for processing the data from the input and/or output device, the system comprising:
   at least one client computing device for transmitting access requests via a communication network, the access requests includes one or more identification attributes corresponding to the client computing device;
   a central communication device in communication with the client computing device via a communication network, wherein the central communication devices receives the access request and transmits a list of available premises-server computing devices, the list of available premises-server computing devices corresponding to a set of premises the client computing device is authorized to access; and
   one or more premises-server computing devices in communication with a number of input and/or output devices, the one or more premises-server computing devices including a proxy application to communicate with the client computing device via a direct communication connection and to transmit device data to the client computing device via the direct communication connection;
   wherein the client computing device cannot establish the direct communication connection with the premises-server computing device prior to obtaining the list of available premises-server computing devices from the central communication device.

35. The system as recited in claim 34, wherein the client computing device transmits the access request via a network-based Web site provided by the central communication device.

36. The system as recited in claim 34, wherein the central communication device transmits software application updates to the client computing device in response to an access request.

37. The system as recited in claim 34, wherein the proxy application in the premises-server computing device registers the client computing device to receive the data from the input/and or output device.

38. The system as recited in claim 37, wherein the registration includes an identification of device data to be received by the client computing device.

39. The system as recited in claim 37, wherein the registration includes instructions for filtering the device data prior to transmitting the device data to the client computing device.

40. The system as recited in claim 37, wherein the registration includes instructions for processing the device data prior to transmitting the device data to the client computing device.

41. The system as recited in claim 37, wherein the direct connection between the proxy application and the client computing device is persistent.

42. The system as recited in claim 37, wherein the proxy application transmits updated device data to the client computing device without requiring a request for updated device data from the client computing device.

43. The system as recited in claim 37 further comprising a device server in communication with the premises-based server computing device, wherein the device server communicates directly with the input and output devices.

* * * * *

UNITED STATES PATENT AND TRADEMARK OFFICE
CERTIFICATE OF CORRECTION

PATENT NO. : 6,839,731 B2
APPLICATION NO. : 10/443120
DATED : January 4, 2005
INVENTOR(S) : B. Alexander et al.

It is certified that error appears in the above-identified patent and that said Letters Patent is hereby corrected as shown below:

| COLUMN | LINE | ERROR |
|---|---|---|
| 13 (Claim 1, | 31 line 25) | "puting device," should read --puting devices,-- |
| 14 (Claim 9, | 1 line 1) | "claim 1" should read --claim 1,-- |
| 14 (Claim 10, | 6 line 1) | "claim 1" should read --claim 1,-- |
| 14 (Claim 12, | 15 line 3) | "computing device" should read --computing devices-- |
| 14 (Claim 15, | 36 line 13) | "computing devices the" should read --computing devices to which-- |
| 14 (Claim 17, | 48 line 1) | "claim 15" should read --claim 15,-- |
| 14 (Claim 18, | 57 line 5) | "computing device" should read --computing devices-- |
| 14 (Claim 20, | 65 line 1) | "claim 15" should read --claim 15,-- |
| 15 (Claim 23, | 17 line 11) | "device;" should read --device; and-- |
| 15 (Claim 24, | 27 line 5) | "devices." should read --output devices.-- |
| 15 (Claim 30, | 50 line 3) | "and/or device" should read --and/or output device-- |
| 15 (Claim 32, | 56 line 2) | "input/and or" should read --input and/or-- |
| 16 (Claim 34, | 3 line 5) | "includes" should read --including-- |

UNITED STATES PATENT AND TRADEMARK OFFICE
CERTIFICATE OF CORRECTION

PATENT NO. : 6,839,731 B2
APPLICATION NO. : 10/443120
DATED : January 4, 2005
INVENTOR(S) : B. Alexander et al.

It is certified that error appears in the above-identified patent and that said Letters Patent is hereby corrected as shown below:

| COLUMN | LINE | ERROR |
|---|---|---|
| 16 (Claim 34, | 8 line 10) | "communication device" should read --communication devices-- |
| 16 (Claim 37, | 39 line 4) | "input/and or" should read --input and/or-- |
| 16 (Claim 43, | 58 line 1) | "claim 37" should read --claim 37,-- |
| 16 (Claim 43, | 61 line 4) | "input and output" should read --input and/or output-- |

Signed and Sealed this

Twenty-fourth Day of October, 2006

JON W. DUDAS
*Director of the United States Patent and Trademark Office*

US006839731C1

(12) INTER PARTES REEXAMINATION CERTIFICATE (643rd)
United States Patent
Alexander et al.

(10) Number: US 6,839,731 C1
(45) Certificate Issued: Jul. 19, 2013

(54) SYSTEM AND METHOD FOR PROVIDING DATA COMMUNICATION IN A DEVICE NETWORK

(75) Inventors: Bruce Alexander, Poulsbo, WA (US); David Antal, Silverdale, WA (US); Matthew Litke, Seattle, WA (US); Christoph Schebel, Suquamish, WA (US); Paul Thompson, Poulsbo, WA (US)

(73) Assignee: Vigilos, LLC, Tyler, TX (US)

Reexamination Request:
No. 95/002,402, Sep. 15, 2012

Reexamination Certificate for:
Patent No.: 6,839,731
Issued: Jan. 4, 2005
Appl. No.: 10/443,120
Filed: May 20, 2003

Certificate of Correction issued Oct. 24, 2006

Related U.S. Application Data

(60) Provisional application No. 60/382,035, filed on May 20, 2002.

(51) Int. Cl.
*G06F 15/16* (2006.01)

(52) U.S. Cl.
USPC ........... 709/201; 709/203; 709/219; 709/227; 713/176

(58) Field of Classification Search
None
See application file for complete search history.

(56) References Cited

To view the complete listing of prior art documents cited during the proceeding for Reexamination Control Number 95/002,402, please refer to the USPTO's public Patent Application Information Retrieval (PAIR) system under the Display References tab.

*Primary Examiner* — Ryan Stiglic

(57) ABSTRACT

A system and method for facilitating data communications in a device network are provided. An integrated information system includes a number of premises-server computing devices, a central communication device, and a number of client computing devices. Each client computing device communicates with the central communication device to request access to device data from the premises-server computing devices. Once access rights are established, the client computing devices communicate directly with specific premises-server computing devices. A command application resident on each premises-server computing device, referred to as the command proxy, administers the direct flow of data between the computing devices.

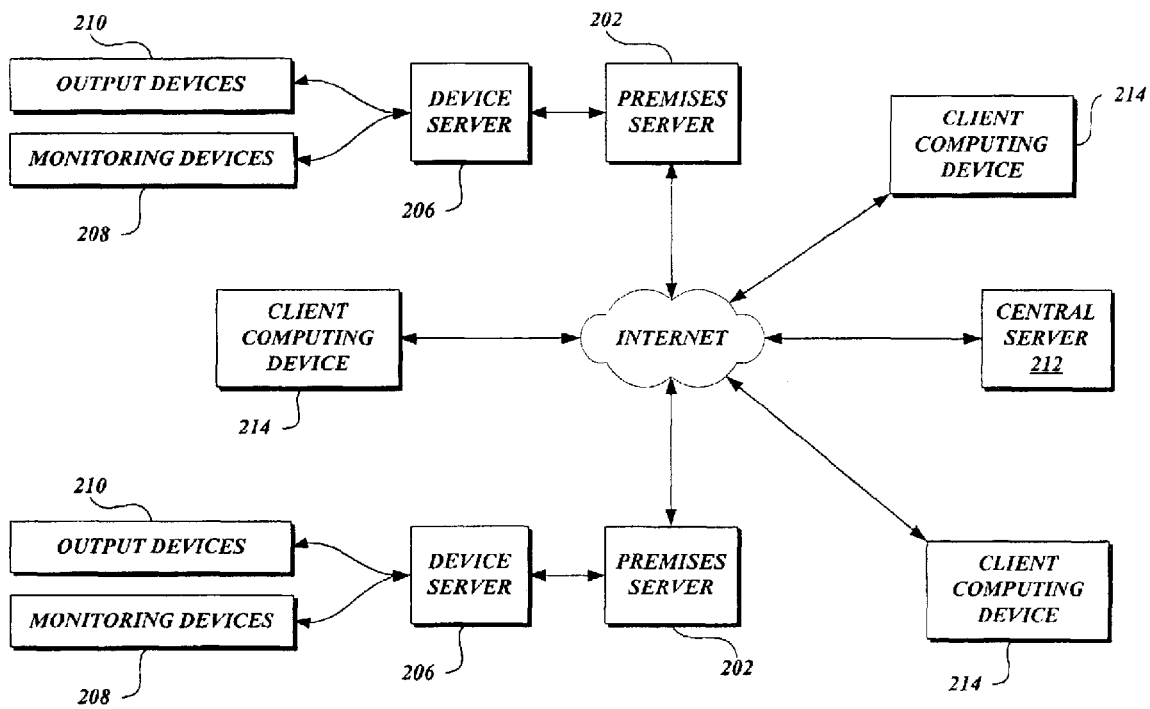

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claim 23 is cancelled.

Claims 1-22 and 24-43 were not reexamined.

* * * * *